United States Patent [19]

Pepicelli et al.

[11] 4,257,268

[45] Mar. 24, 1981

[54] PIPETTER

[75] Inventors: Pasquale L. Pepicelli, Chelmsford; Robert A. Mavilia, Braintree, both of Mass.

[73] Assignee: Data Packaging Corporation, Cambridge, Mass.

[21] Appl. No.: 69,351

[22] Filed: Aug. 24, 1979

[51] Int. Cl.³ .......... G01N 1/14

[52] U.S. Cl. .......... 73/425.6; 73/425.4 P

[58] Field of Search .......... 73/425.6, 425.4 P; 222/309

[56] References Cited

U.S. PATENT DOCUMENTS

| | | | |
|---|---|---|---|
| 3,248,950 | 5/1966 | Pursell et al. | 73/425.6 |
| 3,656,351 | 4/1972 | Raczak | 73/425.6 |
| 3,754,687 | 8/1973 | Norton | 73/425.6 |
| 3,855,867 | 12/1974 | Roach | 73/425.6 |
| 3,954,014 | 5/1976 | Andrews et al. | 73/425.6 |

*Primary Examiner*—Donald O. Woodiel

*Attorney, Agent, or Firm*—Wolf, Greenfield & Sacks

[57] ABSTRACT

A pistol-shaped pipetter capable of operation on a full range of pipettes from 0 to 25 ml and which has a pair of vacuum chambers which are activated by trigger-type devices on the pistol grip of the unit. With a smal volume pipette the selector valve is placed in one setting wherein only one of the vacuum chambers is directly connected to the pipette. With a larger volume pipette, the selector valve is positioned so as to place both vacuum chambers in communication with it. A rapid discharge of the fluid in the pipette is achieved by trigger actuation while a fine, controlled discharge is achieved by an air bleed valve control.

22 Claims, 9 Drawing Figures

PIPETTER

INTRODUCTION

The present invention relates to pipetting and more particularly comprises a new and improved hand tool for performing the pipetting function.

Historically, pipettes have been filled in the laboratory by sucking on the upper end of the pipette to draw fluid into it just as people drink through a straw. This technique has, of course, been recognized for a long time as being exceedingly dangerous to the health of those who performed the pipetting action, and in fact has now been prohibited under certain rules and regulations. As a result, a number of devices have been developed for performing the pipetting function. None of them, however, is wholly satisfactory. Many of the devices cannot accommodate pipettes of more than one size. Others are not portable. Most of the devices available require two hands to operate, and many of them are not closed systems, so that they can actually expel bacteria drawn into them to the atmosphere so as to contaminate the area. Furthermore, many of the prior art devices require manual priming, and the pipetting action is initiated by a spring. Such devices are not easily controlled and are difficult to use when precise metering of the fluids is required.

In accordance with the present invention a pipetter is provided which is wholly portable and can be used with a complete range of sizes of pipettes from 0 to 25 ml. The pipetter has a closed system and therefore never expels the contents of its vacuum system to the atmosphere. The device is provided with an adjustable stop which permits accurate repetitive pipetting, and the tool may be autoclaved. The device can be operated entirely with one hand so that the other hand is free. The pipetter also has direct manual actuation to cause the pipette to draw in fluid, and because the system is not biased by a spring or other device, it is very easily and accurately controlled.

The various features of this invention will be better understood and appreciated from the following detailed description of one embodiment thereof, selected for purposes of illustration and shown in the accompanying drawings.

BRIEF FIGURE DESCRIPTION

Figure 6:
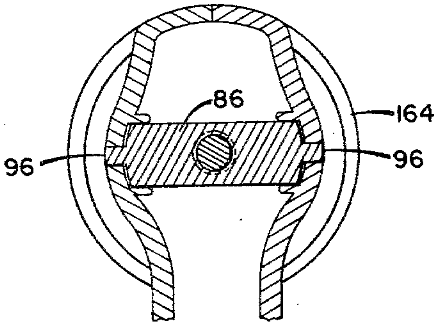
Figure 2:
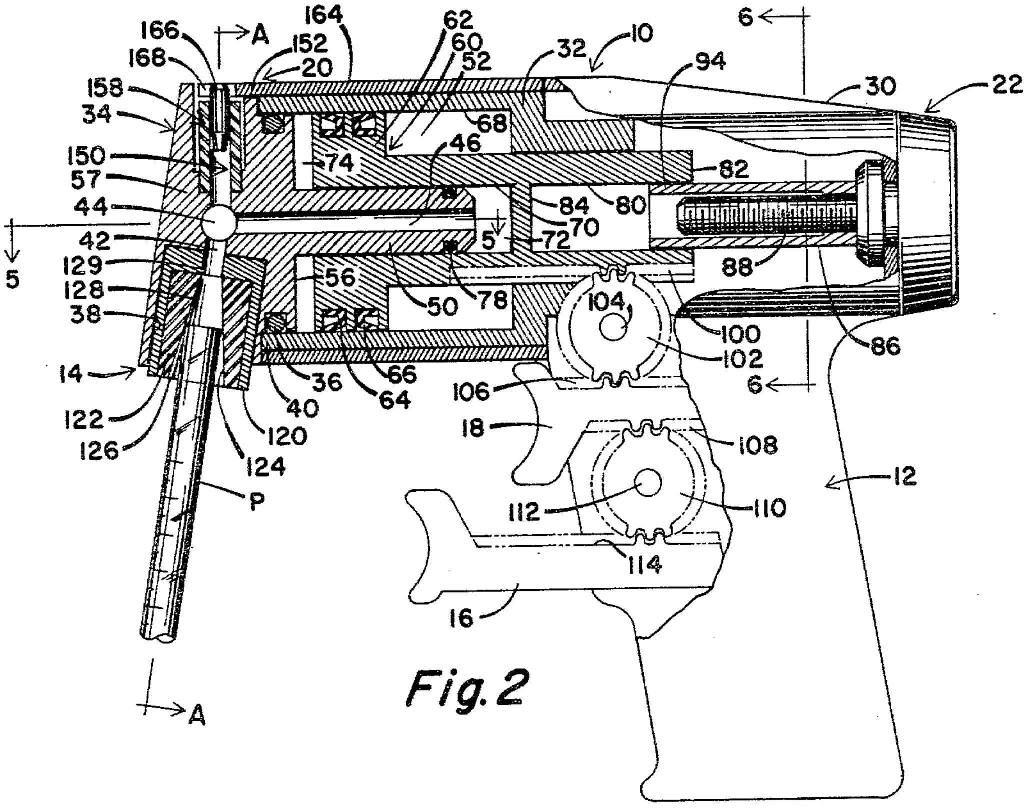
FIG. 2 is a cross-sectional view of the pipetter shown in FIG. 1 and with the movable piston illustrated in an intermediate position.
Figure 5:
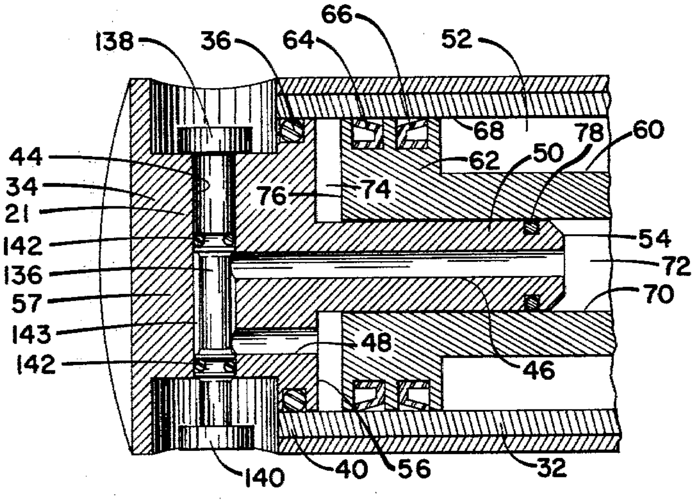
Figure 7:
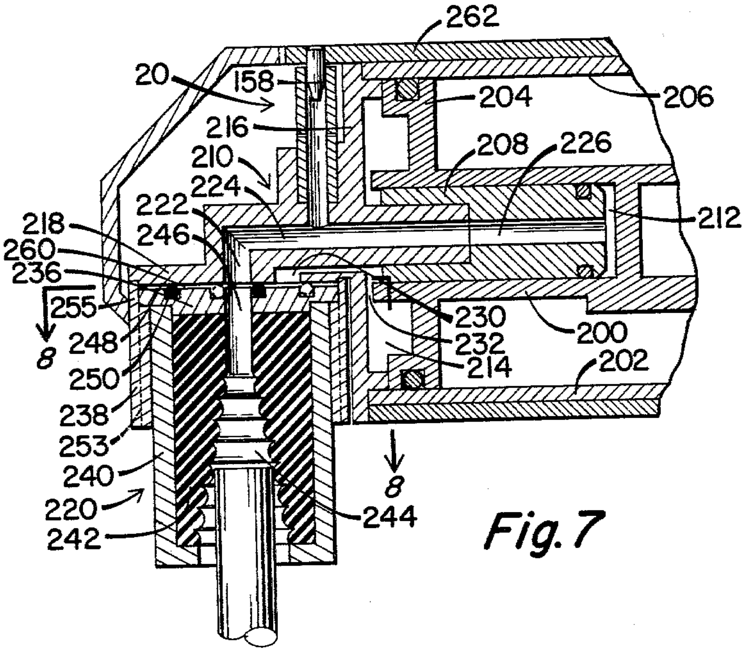
Figure 8:
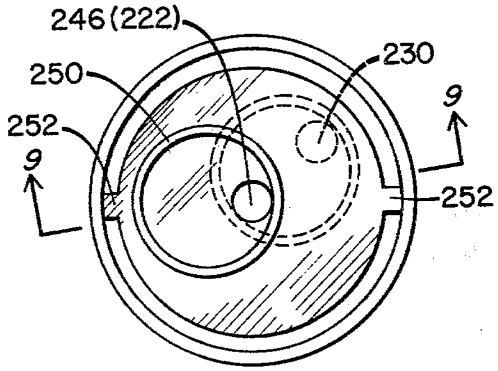
Figure 9:
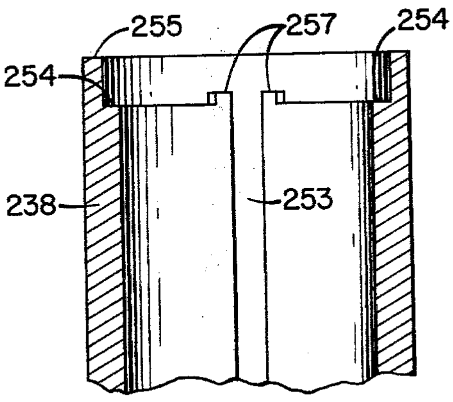

FIGS. 5 and 6 are fragmentary cross-sectional views taken along the section lines 5—5 and 6—6 in FIG. 2, respectively;

FIG. 7 is a fragmentary cross-sectional view of the preferred embodiment of pipetter constructed in accordance with this invention; and showing the adaptor-selector in alternative positions;

FIG. 8 is a plan view of the adaptor-selector assembly viewed in the direction of sight line 8—8 of FIG. 7 and showing the two positions of the adaptor-selector assembly; and FIG. 9 is a fragmentary cross-sectional view of the retainer sleeve that supports the adaptor-selector, viewed in the direction of the section line 9—9 in FIG. 8.

DETAILED DESCRIPTION OF THE INVENTION

The pipetter of the present invention is shown to be pistol-shaped having a body portion 10 and grip 12. In the embodiment of FIGS. 1-6 an adaptor 14 at the front end of the body is designed to hold pipettes of different sizes to be operated by the pipetter. The operation of the pipetter is controlled by a pair of triggers 16 and 18 on the grip 12 and a bleed valve 20 and selector valve 21 on the front end of the body above the adaptor. The pipetter also includes an adjustable stop 22 for enabling the pipetter to repeatedly fill a pipette operated by the device with the same quantity of fluid. All of these various parts of the pipetter are described in detail below both in terms of their physical characteristics and their functions.

Figure 1:
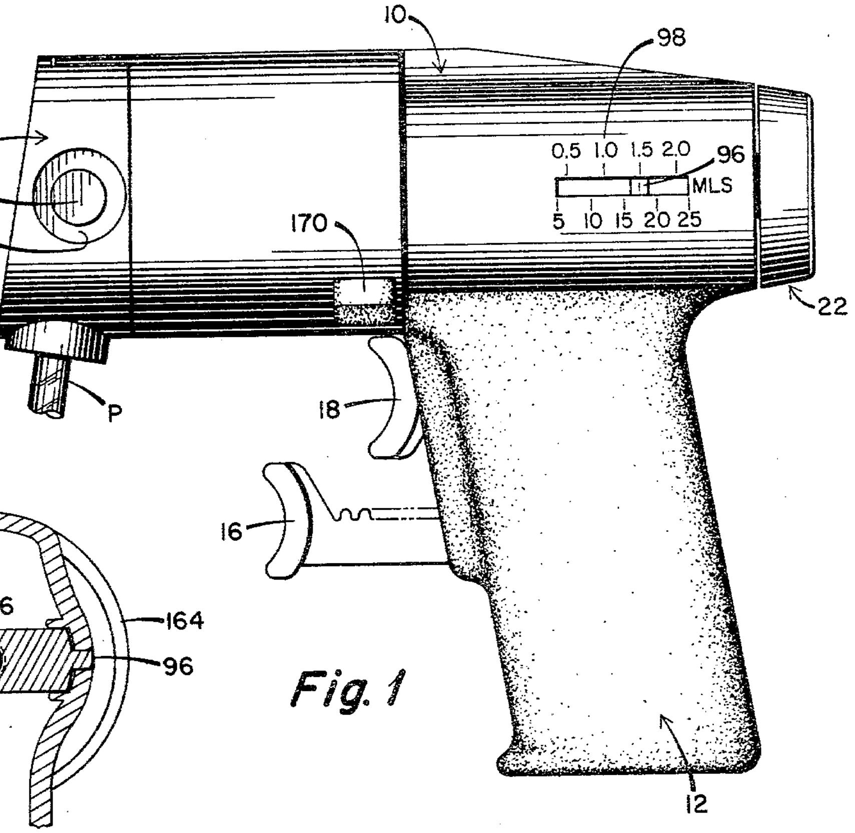
FIG. 1 is a side view of a pipetter constructed in accordance with this invention and shown connected to a pipette which it is to operate.

In FIG. 1, a pipette P is shown mounted in the adaptor 14 at the front end of the body 10 of the pipetter, and the pipette P may be any one of a variety of sizes. Commonly used pipettes range in volume from 1.0 ml to 25 ml, and the pipetter of this invention is designed to accommodate all pipettes within the range.

In FIG. 2 the body 10 is shown to include a rear frame section 30 which in turn receives the front section 32; together they define a housing that supports most of the components of the device. The frame sections 30 and 32 preferably are joined together by a bayonet-type coupling (not shown) or some similar connection which enables the parts to be quickly assembled and disassembled so that the device may in turn be thoroughly cleaned by such means as autoclaving, etc. The front end of the housing is closed by a head 34. The head 34 is sealed by means of an O-ring 36 to the front end of frame section 32.

Head 34 is formed with an upwardly extending cavity 38 forwardly of the front edge 40 of the frame section 32, and the cavity 38 communicates with a passage 42 that extends upwardly in the head and which in turn is connected to a manifold 44 from which two rearwardly extending passages 46 and 48 extend. In the ordinary elevated position of the pipetter, the manifold 44 extends horizontally across the head 34 while passages 46 and 48 extend horizontally and rearwardly in the head.

The head 34 has a rearwardly extending neck 50 coaxial with the front frame section 32 but of substantially smaller diameter so as to define with the section 32 an annulus 52 in the front portion of the body 10. Passage 46 extends coaxially through the neck 50 and opens at the rear surface 54 of the neck. Passage 48 on the other hand extends from manifold 44 to the rear surface 56 of the main section 57 of head 34 as shown in FIG. 5.

A piston 60 is slidably mounted in the annulus 52 on neck 50 of the head, and the piston has a flange 62 of enlarged diameter at its front end, which carries seals 64 and 66 that engage the inner surface 68 of frame section 32. While lip seals are illustrated other types of seals may be used such as one or more O-rings. Piston 60 includes a bore 70 that receives neck 50 of the head, and together they define a small vacuum chamber 72 which enlarges physically as the piston moves rearwardly in the housing. A larger vacuum chamber 74 is formed in the housing between the front surface 76 of flange 62 and the rear surface 56 of main section 57 of head 34. The large vacuum chamber 74 also increases in volume as the piston moves rearwardly in the housing. It will be noted in FIG. 5 that the passage 46 in the head communicates with small vacuum chamber 72 while the passage 48 connects the manifold 44 to large chamber 74. Vacuum chamber 72 is sealed by O-ring 78 carried in an annular recess provided in neck 50 and which bears against the inner surface of bore 70, while seals 64 and 66 along with O-ring 36 seal the vacuum chamber 74.

Piston 60 contains a second bore 80 coaxial with the bore 70 and which is open at the rear end 82 of the piston. The front end of bore 80 is closed by a wall 84 which also closes the vacuum chamber 72. A stop 86 slidably received within bore 80 is threaded onto a stub shaft 88 carried on the collar 90 of control knob 92 of the adjustable stop 22. When the knob 92 is rotated, the stop 86 moves axially on the stub shaft 88, and the front end 94 of the stop may be positioned in the desired location to limit the rearward travel of piston 60. As is evident in FIGS. 1 and 6, sleeve 86 carries pointers 96 on each side which cooperate with calibrations 98 on the body 10, all of which is explained in greater detail below in connection with the operation of the pipetter.

The piston 60 is formed with a rack 100 on its lower side, and the rack registers with a pinion 102 carried on shaft 104 mounted in the handle grip 12. The pinion 102 in turn registers with a second rack 106 on the upper edge of trigger 18, and a second rack 108 on the lower edge of trigger 18 registers with a second pinion 110 mounted on shaft 112 in the handle grip. Yet, a fourth rack 114 formed on the upper edge of trigger 16 registers with the pinion 110, so that the triggers 16 and 18 when depressed respectively move the piston rearwardly and forwardly in the housing. The two triggers are opposed to one another and move in opposite directions by virtue of their connection to opposite sides of pinion 110. Thus, when trigger 16 is depressed (moved to the right as viewed in FIG. 2), pinion 110 rotates counterclockwise causing the trigger 18 to move to the left, which in turn causes the pinion 102 to turn clockwise and in turn move the piston 60 to the right. On the other hand, when the trigger 18 is depressed (moved to the right), pinion 102 rotates counterclockwise causing the piston 60 to move to the left in the housing.

The cavity 38 in the head 34 is lined by a cup-shaped member 120 which in turn receives the rubber-like adaptor sleeve 122 forming the coupling of the adaptor 14. The adaptor sleeve 122 has a tapered passage 124 with its maximum diameter at its lower end 126 and its minimum diameter at the inner end 128 which registers with the passage 42 in the head 34. (A port 129 in the member 120 actually joins the passage 124 and 42.) It will be apparent that the tapered configuration of the passage 124 allows a pipette of any size to be inserted in the sleeve and form a seal with it. The upper ends of pipettes may be provided with a flange which will bite into the flexible material of the sleeve 122 to form the desired seal. A 1.0 ml pipette will fit into the sleeve 122 quite deeply so that the flange lies close to the end 128, while a large pipette of 25 ml volume will just fit in the passage 124 beyond the end 126.

The manifold 44 which extends horizontally in the head terminates in cavities 130 and 132. A stem 134 forming part of selector valve 21 and having a central portion 136 of reduced diameter extends through the manifold 44, and the stem in turn carries a pair of actuator heads 138 and 140 disposed in the cavities 130 and 132, respectively, to enable the stem to be conveniently shifted between the positions shown in FIGS. 3 and 4. The stem carries a pair of O-rings 142 on either side of the reduced diameter section, which form seals against the inner surface of the manifold 44. The reduced diameter section 136 and the inner surface of manifold 44 define an annular connecting chamber 143.

Figure 3:
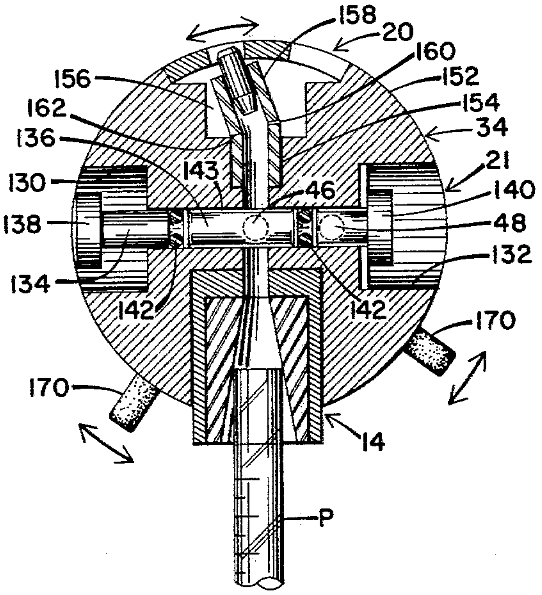
FIG. 3 is a cross-sectional view taken along the section line A—A of FIG. 2 and showing the selector valve in the position used when the pipetter operates a small pipette and with the air bleed valve open for slowly discharging the contents of the pipette.

When the selector valve defined by the manifold 44 and stem 134 is in the position shown in FIG. 3, it is apparent that the tapered passage 124 in adaptor 14 communicates through chamber 143 with the passage 46 in the head, but not with the passage 48. On the other hand, when the stem is shifted to the position shown in FIG. 4 the tapered passage 124 in the adaptor is in communication through chamber 143 with both passages 46 and 48. And the stem may readily be shifted from one position to the other by pressing the appropriate head 138 or 140 carried on the ends of the stem. As is explained fully below, the position of the selector valve is determined by the size of the pipette to be operated by the pipetter. For small pipettes of perhaps 2 ml or less, the position for the valve shown in FIG. 3 is used, while for larger pipettes having a capacity from 2 ml to 25 ml, the position shown in FIG. 4 is utilized.

The structure of the pipetter is completed by the air bleed valve subassembly 20. The subassembly is formed in the head 34 by a bore 150 which extends from the upper surface 152 of the head to the manifold 44. The bore 150 is countersunk with a larger section 154, and the upper end of that section terminates in a large circumferential slot 156. A flexible tube 158 is mounted in the section 154 of the bore 150 and its upper end is disposed within the slot 156. Thus, while the lower end of tube 158 is fixed in position with its passage aligned with bore 150, the upper end of the tube 158 is loosely contained within slot 156 so that it may be deflected either to the right or left within the slot. In FIG. 3 the tube is shown deflected to the left while in FIG. 4 it is in its normal position.

Figure 4:
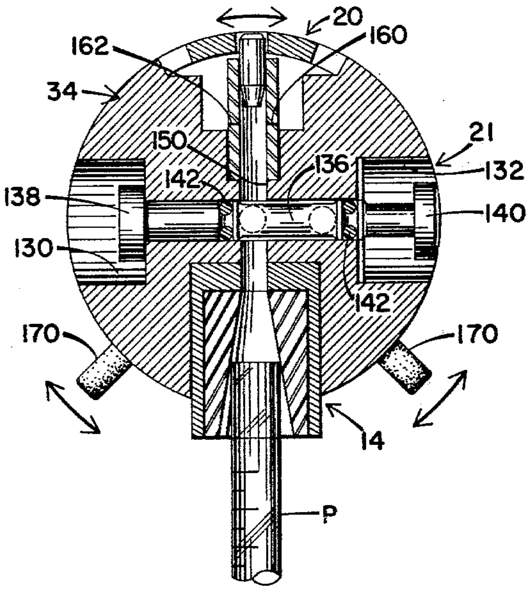
FIG. 4 is a cross-sectional view also taken along the section line A—A in FIG. 2 but showing the selector valve in a second position used when the pipetter operates a larger pipette and with the air bleed valve closed.

A pair of narrow slits 160 and 162 are formed in the tube 158 above the countersunk section 154 and within the slot 156, and one or the other two slits 160 and 162 may be opened by deflecting the tube in the manner shown in FIG. 3 or in the opposite direction to the right of the position of FIG. 4. It will be apparent that the tube may be deflected in the opposite direction so as to open the slit 162 while maintaining the slit 160 closed.

The upper end of the tube 158 is connected to a cylindrical barrel 164 rotatably carried on the frame section 32 by means of a plug 166 anchored in and which seals the upper end of the tube. The plug lies in slot 168 in the front end of the barrel. The barrel in turn carries a pair of ears 170 on either side of the handle at its rear portion closely adjacent the upper trigger 18, so that the barrel may be turned by the person using the pipetter, without removing his hand from the grip. That is, the thumb or index finger of the hand engaging the grip may be used to engage the respective ears on the barrel so as to rotate it in either direction. And rotation in either direction, as explained above, will cause one of the slits 160 or 162 to open. It will also be appreciated that when the barrel is in the neutral position so that the sleeve is not bent but rather remains axially straight as shown in FIG. 4, both slits 160 and 162 remain closed. Because the upper end of tube 158 is sealed by the plug 166, no air can bleed through the sleeve or tube 158 into the manifold.

The preferred embodiment of the invention shown in FIGS. 7–9 differs from that shown in FIGS. 1–6 in the construction of the front end of the pipetter, and particularly of the adaptor which receives the pipette and the selector that determines which of the vacuum chambers is operative to draw liquid into the pipette. These differences only are described in the following description of this preferred embodiment.

In FIG. 7 the piston 200 is shown to be slidably mounted in the front frame section 202 of the body, and an O-ring seals the piston flange 204 against the inner surface 206 of the frame. The piston slides on the neck 208 of the head assembly 210, and the piston, frame and neck together form the small and large vacuum chambers 212 and 214 in the same manner as in the embodiment of FIG. 1–6. In the head assembly 210 as shown in FIG. 7, neck 208 is welded or otherwise secured to the circular wall 216 that defines the front end of vacuum chamber 214 and includes a disk 218 in direct contact with the adaptor assembly 220.

Passage 222 extends upwardly from the center of the disc 218 and turns at a right angle to the portion 224 which is concentric with the center of circular wall 216 and terminates at the port 226 in neck 208 in communication with small chamber 212. The second passage 230 extends upwardly from disc 218 and turns rearwardly generally parallel to the portion 224 and through port 232 communicates with the large vacuum chamber 214.

The adaptor 220 includes a circular end wall 236 facing disc 218, retainer sleeve 238, and barrel 240 secured to and rotatable with the end wall 236. End wall 236 and barrel 240 form the adaptor housing which contains the rubber-like gasket 242 that has a scalloped, tapered central passage 244 concentric with the passage 222 and the connecting port 246 in the end wall 236. The scalloped configuration of passage 244 is designed to form an effective seal about the neck of any size pipette inserted into it.

The face 248 of end wall 236 opposite the bottom of disc 218 carries an O-ring 250 surrounding and disposed eccentrically with respect to port 246 in end wall 236, as is shown in FIG. 8. As also shown in that figure, the end wall 236 has a pair of ears 252 that are sized to be received within the axially extending slots 253 on the inner surface of the retainer sleeve 238. Those slots terminate at the shoulder 254 in the upper end face 255 of the sleeve. The shoulder forms an undercut chamber for the end wall 236 when the adaptor is mounted in place as shown in FIG. 7. Stops 257 are provided on the shoulder adjacent one slot (see FIG. 9) to engage the ears 252 so as to limit the rotation of the retainer housing to approximately 180°. To assemble the housing in place, the ears are aligned with the bottoms of the slots and the housing is then inserted in sleeve 238. When the O-ring engages the bottom face of disc 218, a force is applied to the housing so as to compress the O-ring and allow the ear to jump over the stop. When that is accomplished the housing may be released. A slight gap 260 will be formed between the disc 218 and end wall 236 as the O-ring will act as a spring, and the stop will limit the rotation of the housing and prevent the ears from realigning with the slots so that the housing will not unintentionally be removed.

When the adaptor housing is in one of its extreme rotational positions (the full line position of FIGS. 7 and 8), the gap 260 will join the port 246 to passage 22 only, as the O-ring 250 will define the effect limits of the gap. When the housing is in the other extreme position, (the broken line position of FIGS. 7 and 8), the gap will connect port 246 with both passages 222 and 230. Thus the adaptor serves as the selector to control the volume of liquid drawn into the pipette by actuation of the trigger mechanism (not shown).

It will be appreciated that bleed valve 20 is the same in the preferred embodiment and includes tube 158 seated in the head assembly and controlled by the outer barrel 262. The bleed tube 158 is in constant communication with the passage 222 and when bent in either direction the vacuum system is vented to the atmosphere.

OPERATION

The particular pipette to be used with the pipetter of FIGS. 1–6 is inserted into the adaptor 14 so that its upper end forms a seal with the sleeve 122. If the pipetter has a volume of 2 ml or less, the selector valve 21 is placed in the position shown in FIG. 3 by depressing the head 140. In this position, the annular space 143 in the manifold 44 surrounding the stem portion 136 is in communication with passage 46 and the small vacuum chamber 72. The person using the device should also position the adjustable stop 22 so that the indicator 180 is aligned with the volume calibration 182 which just exceeds the volume to be drawn into the pipette. The operator should not turn the barrel 164 from its neutral position so that the bleed valve 20 is closed, and preferably the trigger 18 is in the fully depressed position so that the piston 60 is in the extreme forward position. The bottom end of the pipette is then placed in the flask or other container carrying the fluid to be drawn into it, and the trigger 16 is depressed. As the trigger 16 is depressed, the piston 16 moves to the right as viewed in FIG. 2, and the vacuum chamber 72 expands so as to create a vacuum that causes the fluid in which the lower end of the pipette is submerged to rise up into the pipette body. Visually following the calibrations on the pipette, the operator may fill the pipette to or somewhat above the desired volume level. The operator can then reduce the volume in the pipette by depressing either of the ears 170 on the barrel so as to open the bleed valve 20. This action allows air to flow into the vacuum system and thereby increase the pressure above the fluid column and cause the fluid in the pipette to flow slowly from it. When the desired level is reached, the operator then merely releases the barrel ear so that the bleed immediately closes under the natural bias of the tube 158, and no further fluid discharges from the pipette.

To expel the volume of fluid in the pipette, the lower end of the pipette is placed in the flask or other container in which the fluid is to be deposited, and the trigger 18 is depressed. This action rapidly forces the fluid from the pipette by rapidly increasing the pressure in the chamber 72. The elimination of the vacuum in the chamber of course causes the pipette to empty.

If the pipette to be used has a capacity greater than 2 ml., the selector valve 21 is placed in the position shown in FIG. 4 by depressing the head 138 of stem 134. In that position, the annular space 143 about the reduced portion 136 of the stem in the manifold 44 communicates with both passages 46 and 48 so that both small and large vacuum chambers 72 and 74 draw liquid into the pipette as the piston 60 is moved rearwardly in the housing. The cross-sectional area of the vacuum chamber 74 is many times larger than that of chamber 72, and when both chambers 72 and 74 are placed in communication with the pipette P in the adaptor 14, a much greater volume is evacuated with each incremental step of the piston 60, thereby causing a much greater rate of flow into the pipette with piston displacement. In setting the adjustable stop, the appropriate scale should be used.

When the pipetter is to be used in a repeated series of operations so as to fill the pipette to the same amount over and over again, the adjustable stop 22 may be used. When the pipette is filled to a particular volume by actuation of the trigger 16 the adjustable stop 22 may then be utilized by turning the knob 92 so that the front end 94 of sleeve stop 86 engages the wall 84 at the base of bore 80. Thereafter, the rearward motion of the piston 60 will be limited by the sleeve stop to the same distance, and therefore the same vacuum will be generated so as to draw the same amount of liquid into the pipette for accurate repetitive pipetting.

It will also be appreciated that the pipetter of this invention may be utilized to agitate liquid. By placing the index finger on the trigger 18 and the third finger on trigger 16 and alternately depressing the two triggers in rapid sequence, the pipette will rapidly draw in and expel liquid in which its end is placed, and this action can be used to remove cultures or other substances which may adhere to the walls of a container.

The foregoing description of the operation of the pipetter applies equally to the use of the preferred embodiment except of course as to the operation of the selector. With respect to that embodiment, if the device is to be used with a pipette having a volume of 2 ml or less, the adaptor housing is rotated to a position wherein the gap 260 surrounded by O-ring 250 connects port 246 only with the passage 222. On the other hand, if a pipette having a capacity greater than 2 ml is used, the housing is rotated so that the gap connects port 246 with both passages 22 and 246 so as to draw a greater volume into the pipette with each actuation of the trigger.

From the foregoing description it will be appreciated that the pipetter of this invention has many advantages. For example, the single device may be used on a complete size-range of pipettes. And the device is capable of being manipulated by one hand (either left or right) while the other is free to perform other functions. Note that ears 170 and calibrations and pointers 96, 98 are on both sides of the body. It will be appreciated that both the stop 22 and the bleed valve 20 may be actuated by the fingers of the same hand that holds the grip 12 of the device. The pipetter may also quite readily be disassembled and it may be autoclaved or otherwise treated and then be quickly reassembled.

Yet another advantage of the present device is that it is completely portable. It is manually operated and yet the single unit can accommodate a complete range of pipette sizes. Furthermore, the system is closed and therefore does not exhaust the contents of the vacuum system to the atmosphere, which could contaminate the area. Rather, just air bleeds into the system. And the adjustable stop provides means for accurate repetitive pipetting. As still another advantage, the pipetter of the present invention does not require priming. While in most if not all prior art devices the unit is first manually primed and then is spring actuated for pipetting, in the present device the pipetting is manually actuated and may be stopped at any time for more accurate control.

Because modifications may be made of this invention without departing from its spirit, it is not intended to limit the breadth of the invention to the two embodiments illustrated and described. Rather, it is intended that the scope of this invention be determined by the appended claims and their equivalents.

I claim:

1. A pipetter comprising a pistol-shaped frame including a grip and cylinder, a head mounted in the cylinder remote from the grip and having a front portion of large diameter sealed to the inner surface of said cylinder, said head also having a rear-portion of reduced diameter extending rearwardly in the cylinder and said rear portion being spaced from the inner surface of the cylinder, a piston slidably mounted in the cylinder about the rear portion of the head and having a front portion sealed to the inner surface of the cylinder behind the front portion of the head and having a rear wall enclosing the back of the head, a small vacuum chamber defined between the rear of the rear portion of the head and the rear wall of the piston and a large vacuum chamber defined between the rear of the front portion of the head and the front of the front portion of the piston and within the cylinder, an adapter mounted in the front portion of the head for receiving one end of a pipette to be used with the pipetter, first and second passages in the head connecting the adaptor to the small and large vacuum chambers for applying a vacuum to a pipette mounted in the adaptor, first and second triggers mounted on the grip, racks on each of the triggers and a pinion engaging the racks causing each trigger to move forwardly when the other moves rearwardly on the grip, additional racks mounted on one of the triggers and the piston and a second pinion engaging the additional racks enabling actuation of the triggers to move the piston back and forth in the cylinder to expand and contract both of the vacuum chambers, and selector valve means mounted on the cylinder for selectively connecting either the small vacuum chamber or both the small and large vacuum chambers to the adaptor for varying the rate at which fluid may be drawn into the pipette as the piston is moved back in the cylinder.

2. A pipetter in accordance with claim 1 further characterized by a bleed valve mounted on the cylinder and connected to the passages for reducing the vacuum impressed on the pipette without moving the piston so as to provide a fine control of fluid discharge from the pipette.

3. A pipetter in accordance with claim 1 further characterized by an adjustable stop mounted on the frame for limiting the rearward travel of the piston and enabling the pipetter to impress a repeatable vacuum on successive pipettes mounted in the adaptor.

4. A pipetter comprising a frame including a handle, means including a piston mounted in the frame and defining first and second vacuum chambers in said frame, an adaptor mounted on the frame for engaging one end of a pipette, passages in the frame for connecting the adaptor to each of the chambers, valve means on the frame connected to at least one of the passages for opening and closing at least one of the passages, and an actuator on the handle and connected to the piston for moving the piston in the frame to increase the size of the vacuum chambers so as to draw fluid into a pipette mounted in the adaptor.

5. A pipetter in accordance with claim 4 further characterized by a bleed valve mounted on the frame and connected to the adaptor for enabling the vacuum to be relieved on the pipette in the adaptor without moving the piston.

6. A pipetter in accordance with claim 4 further characterized by an adjustable stop mounted on the frame for providing a fixed limit of travel of the piston and enabling the pipetter to impress a repeatable vacuum on pipettes mounted on the adaptor.

7. A pipetter in accordance with claim 5 further characterized by an adjustable stop mounted on the frame for providing a fixed limit of travel of the piston and enabling the pipetter to impress a repeatable vacuum on pipettes mounted on the adaptor.

8. A pipetter comprising a frame including a cylinder having front and rear ends, a head mounted in the front end of the cylinder and having a rearwardly extending portion of reduced diameter within the cylinder and spaced from the cylinder, a piston movable in the cylinder on the rearwardly extending portion of the head, said piston being closed at its rear over said portion of the head to define a first vacuum chamber in the cylinder, a second vacuum chamber in the cylinder surrounding the rearwardly extending portion of the head and defined in part by the piston, an adaptor mounted on the head for receiving one end of a pipette to be operated by the pipetter, passages in the head connecting the adaptor to each of the vacuum chambers, an actuator connected to the piston for moving it back and forth in the cylinder to enlarge and reduce the sizes of the vacuum chambers, and valve means connected to the passages for selectively connecting at least one chamber to the adaptor so as to vary the rate at which fluid is drawn into the pipette as the piston moves through incremental steps in the cylinder.

9. A pipetter in accordance with claim 8 further characterized by a bleed valve mounted on the frame and connected to the adaptor for enabling the vacuum to be relieved in the pipette in the adaptor without moving the piston.

10. A pipetter in accordance with claim 8 further characterized by an adjustable stop mounted on the frame for limiting the travel of the piston and enabling the pipetter to impress a repeatable vacuum on pipettes mounted on the adaptor.

11. A pipetter in accordance with claim 8 further characterized by said frame being in the shape of a pistol with the actuator being a trigger on the pistol grip.

12. A pipetter in accordance with claim 11 further characterized by said actuator being a pair of triggers on the grip positioned to be simultaneously engaged by separate fingers of the user, and means connecting the triggers to the piston causing said triggers when actuated to move the piston in opposite directions.

13. A pipetter in accordance with claim 12 further characterized by a bleed valve mounted on the frame and connected to the adaptor for enabling the vacuum to be relieved on the pipette in the adaptor without moving the piston, and a barrel mounted on the frame about the cylinder and connected to the bleed valve enabling the bleed valve to be actuated by fingers of the hand holding the grip.

14. A pipetter in accordance with claim 12 further characterized by an adjustable stop mounted on the frame for limiting the travel of the piston and enabling the pipetter to impress a repeatable vacuum on pipettes mounted on the adaptor, and an actuating dial mounted on the frame and connected to the stop enabling the stop to be adjusted by the fingers of the hand holding the grip.

15. A pipetter in accordance with claim 8 further characterized by said bleed valve including a flexible tube connected at one end to the passages and closed at its other end, a slit in the side of the tube closed when the tube is straight, and actuating means connected to the tubes causing the tubes to bend and open the slit to connect the interior of the tubes to the atmosphere to bleed air into the passages.

16. A pipetter in accordance with claim 8 further characterized by the first chamber being smaller than the second chamber, and said valve means connecting and disconnecting the second chamber to the adaptor while maintaining the connection between the first chamber and the adaptor.

17. A pipetter in accordance with claim 8 further characterized by said valve means connecting and disconnecting the second chamber to the adaptor while maintaining the connection between the first chamber and the adaptor.

18. A pipetter in accordance with claim 8 further characterized by said valve means including a port in the adaptor, a chamber between the port and the head, and means movably mounting the adaptor in the head enabling the chamber to connect the port in the adaptor with either one or both of the passages.

19. A pipetter in accordance with claim 4 further characterized by means movably mounting the adaptor on the frame, said adaptor when moved to one position opening said one of the passages and when moved to a second position closing said one of the passages.

20. A pipetter in accordance with claim 19 further characterized by said adaptor being rotatably mounted on the frame, a port in the adaptor and a chamber between the adaptor and the frame, a seal mounted accentrically on the adaptor and defining the limits of the chamber, said chamber connecting the port to one of the passages when the adaptor is in one position and connected the port to both passages when the adaptor is in a second position, and an opening in the adaptor connected to the port for receiving the pipette to be operated by the pipetter.

21. A pipetter comprising a frame, movable walls defining first and second expandible vacuum chambers in the frame, an adapter connected to the frame for engaging one end of a pipette, passages in the frame for connecting the adapter to each of the chambers, valve means on the frame connected to at least one of the passages for opening and closing at least one of the passages, and an actuator on the frame connected to said walls for moving them in the frame to increase the size of the chambers so as to draw fluid into a pipette mounted in the adapter.

22. A pipetter in accordance with claim 21 further characterized by said movable walls defining the chambers being connected together.

* * * * *